May 5, 1931. E. W. BEIDLER ET AL 1,804,141
HYDRAULIC SHOCK ABSORBER
Filed March 24, 1930 3 Sheets-Sheet 1

Inventor
E. W. Beidler
A. C. Roessler
Hull, Brock & West
Attorney

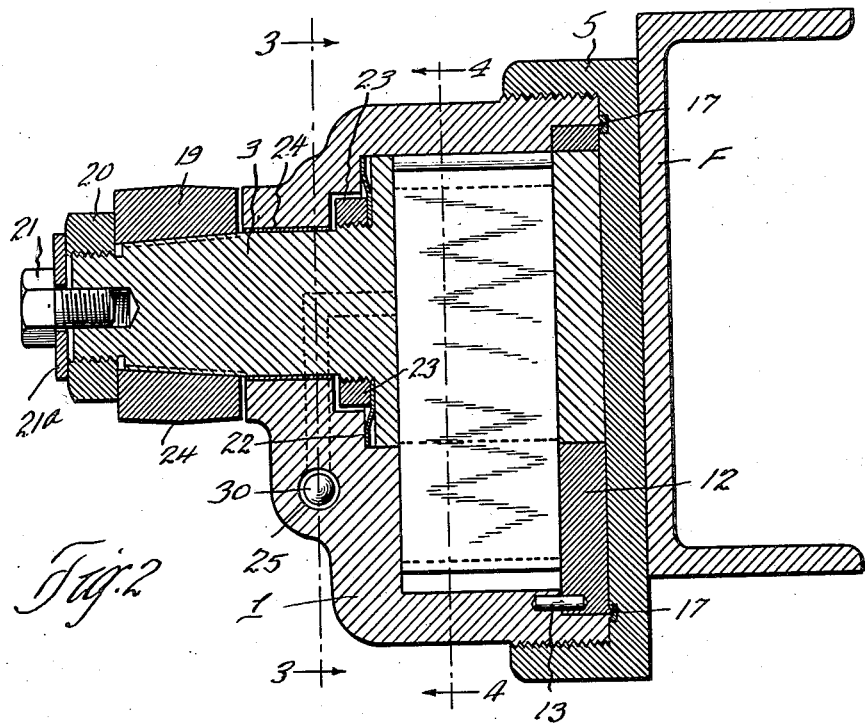
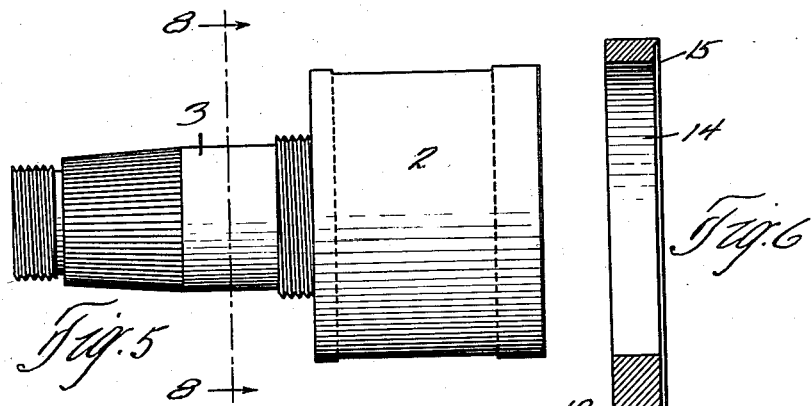
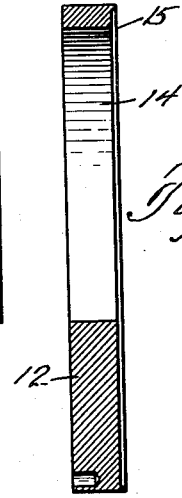
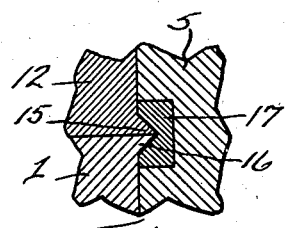

May 5, 1931. E. W. BEIDLER ET AL 1,804,141
HYDRAULIC SHOCK ABSORBER
Filed March 24, 1930   3 Sheets-Sheet 3
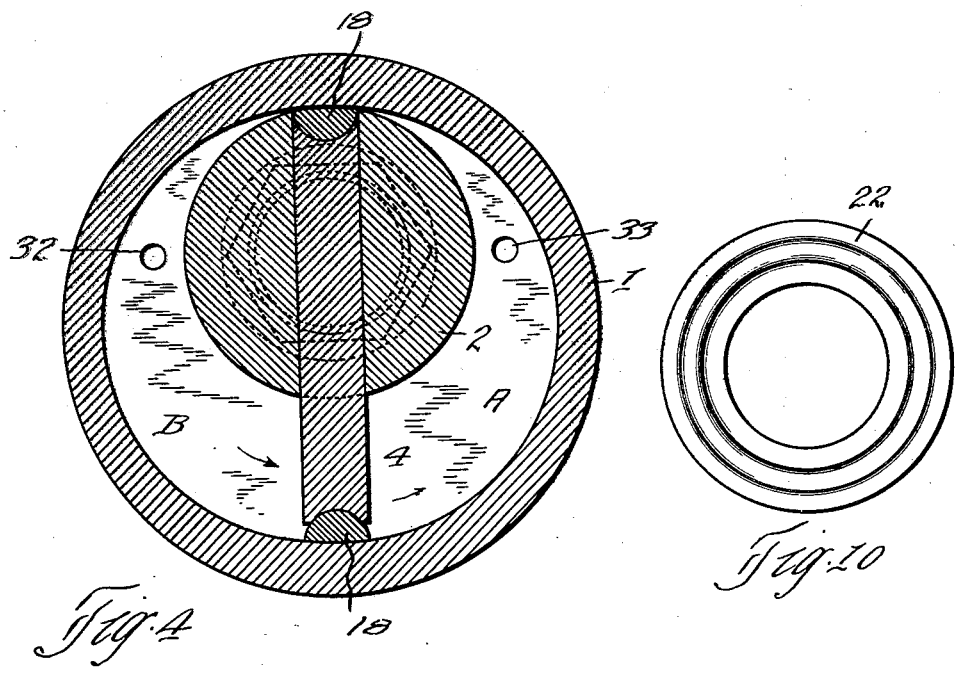
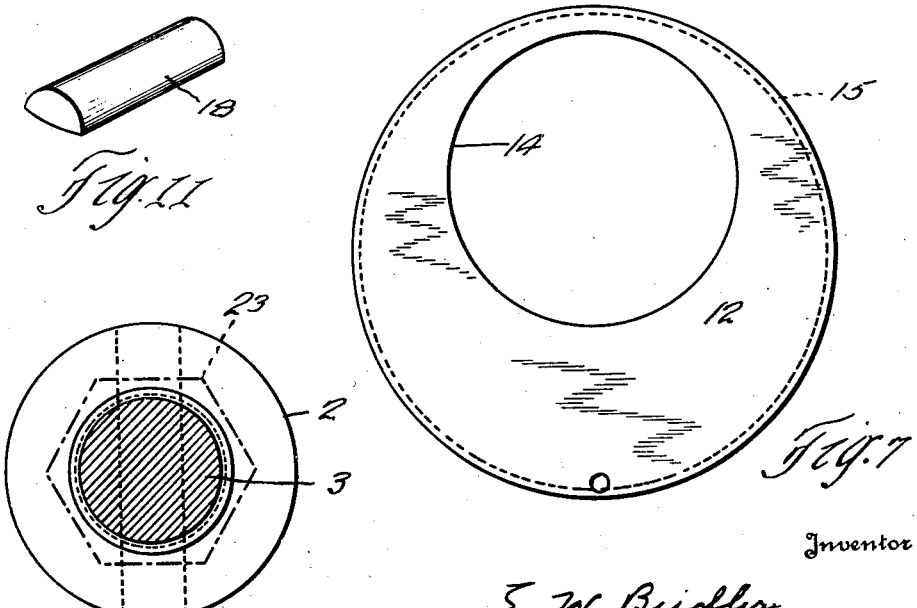

Patented May 5, 1931

1,804,141

UNITED STATES PATENT OFFICE

ELLIOTT W. BEIDLER, OF ELYRIA, AND AMANDUS C. ROESSLER, OF LAKEWOOD, OHIO, ASSIGNORS TO ROMEC CORPORATION, OF ELYRIA, OHIO, A CORPORATION OF OHIO

HYDRAULIC SHOCK ABSORBER

Application filed March 24, 1930. Serial No. 438,310.

This invention relates generally to hydraulic shock absorbers and more particularly to hydraulic shock absorbers suitable for use on automotive vehicles, although the device is of general application and well adapted for various uses.

The main object of the invention is to provide a shock absorber of the character described which is simple in construction, dependable and efficient in operation and well adapted for quantity production at comparatively low cost.

Another object of the invention is to provide a shock absorber of the character described which consists essentially of a pressure chamber in which is mounted a rotor having a sliding piston or vane extending therethrough and disposed in sliding contact with the interior walls of the pressure chamber.

Another object of the invention is to provide a hydraulic shock absorber of the character described which is provided with a pressure chamber the inner peripheral wall of which is shaped to conform to a limacon and in which is mounted a rotor having its axis of rotation passing through the chordal center of the limacon and parallel to the principal axis thereof, together with a vane or piston blade which extends through the rotor transversely of its axis, the piston blade or vane being shorter than the chordal length of the limacon and provided with seats at its opposite ends in which are mounted rockers adapted for pivotal movement toward either side of the piston blade and having working faces conforming to the inner wall of the pressure chamber and adapted to bear against the walls thereof as the piston blade is moved in either direction.

Figure 1:
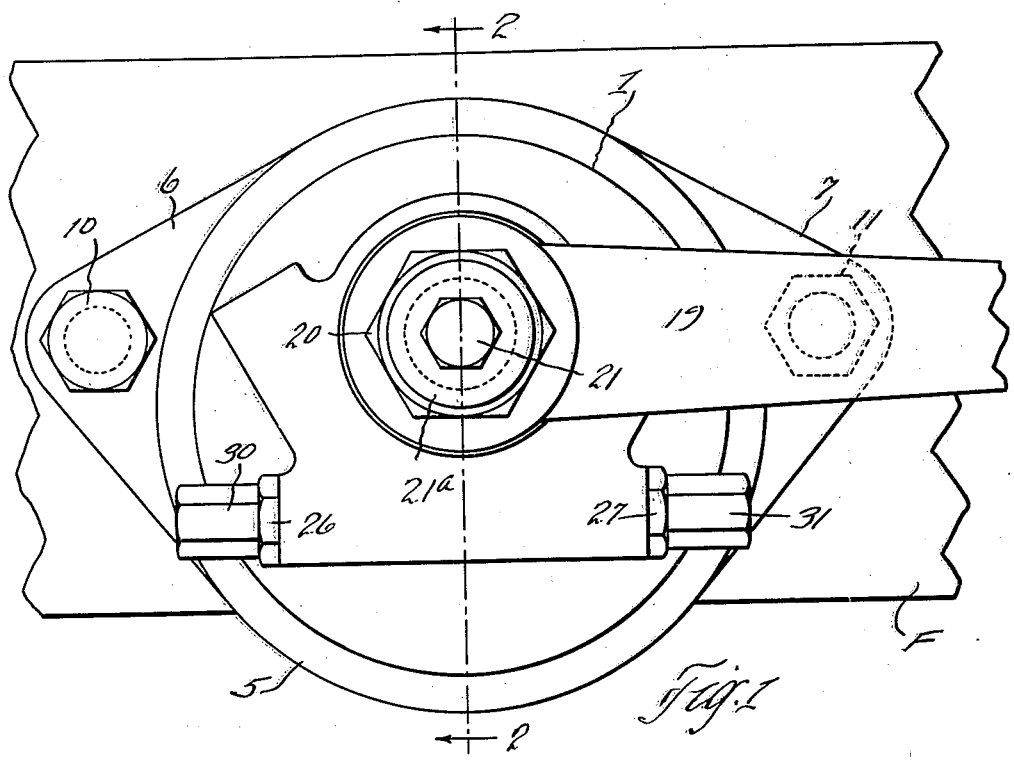
Figure 3:
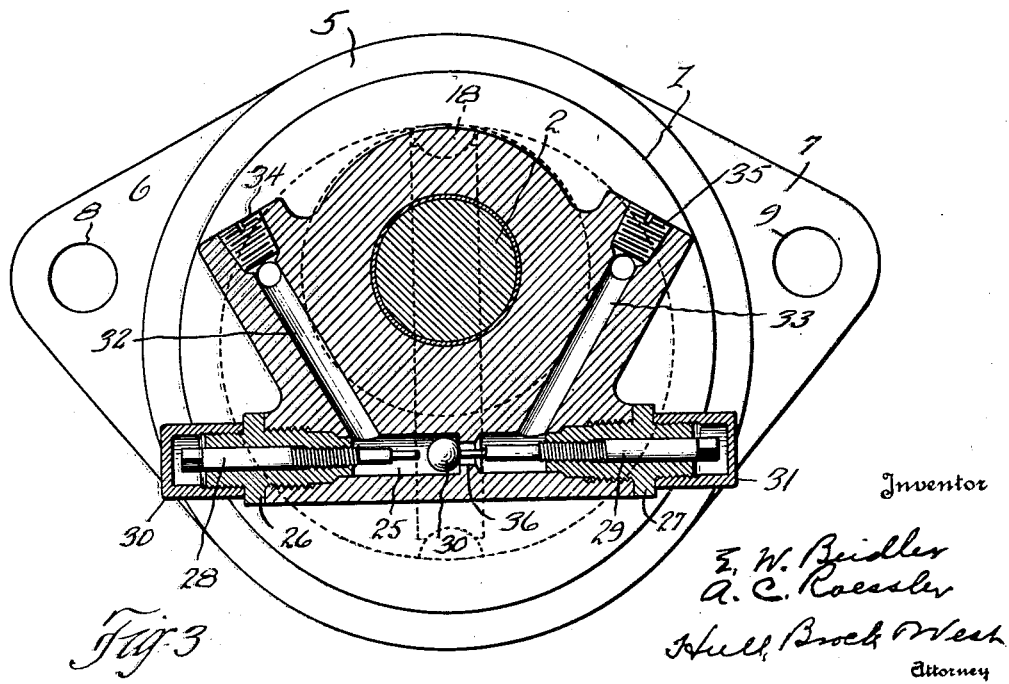

Further and more limited objects of the invention will appear as the description proceeds and by reference to the accompanying drawings in which Fig. 1 is a fragmentary view in end elevation disclosing the preferred embodiment of our invention attached to the frame of a motor vehicle; Fig. 2 is a vertical sectional view on the line 2—2 of Fig. 1; Fig. 3 is a vertical sectional view on the line 3—3 of Fig. 2; Fig. 4 is a vertical sectional view on the line 4—4 of Fig. 2; Fig. 5 is a view in side elevation of the rotor removed from the casing; Fig. 6 is a vertical sectional view of the holding ring; Fig. 7 is a view in front elevation of the holding ring; Fig. 8 is a vertical sectional view on the line 8—8 of Fig. 5; Fig. 9 is an enlarged fragmentary sectional view disclosing the manner of forming the joint between the holding ring and the inner end of the casing; Fig. 10 is a view in front elevation of the washer for preventing leakage around the shaft of the rotor and Fig. 11 is a perspective view of the pin for holding the bearing ring against rotary movement.

Referring now to the drawings the reference character 1 designates a hollow housing or casing preferably formed of cast metal and in which is journaled a rotor 2 having a reduced portion 3 defining a shaft which projects through an opening in the casing. The inner peripheral wall of the casing is shaped to conform to a limacon curve. Extending through and slidably mounted in the rotor 2 is a vane or piston 4 which is to be more fully described hereinafter. It is essential that this piston contact with the walls of the pressure chamber at both of its ends; and as the piston blade which we propose to use is fixed in its length, it is obvious that the blade constitutes a movable chord and as the rotor 2 which carries this blade is mounted eccentrically with respect to the pressure chamber, the proper curvature of the bore can be mathematically obtained from the eccentric relation of the rotor to the bore and the length of the chord. This curve is known as a limacon curve and is disclosed in United States Letters Patent No. 1,649,256 which issued November 15, 1927 to A. C. Roessler. This patent discloses one manner of generating the limacon curve which is well known in the art.

The inner end of the chamber is closed by a cap or cover 5 which is threadedly secured thereover and is provided with oppositely disposed flanges or projections 6 and 7 having apertures 8 and 9 therein through which extend bolts 10 and 11 for securing the casing to the frame of an automotive vehicle. Arranged within the inner end of the piston chamber is a bearing ring 12 which is non-rotatably secured within the casing by means of a pin 13. The holding ring 12 is provided with a circular opening 14 which is eccentrically arranged therein, as shown most clearly in Fig. 7. The holding ring 12 is provided with a peripheral lip 15 and the inner edge of the casing is provided with a complementarily shaped lip 16 both of which engage in a depression formed in an annular packing ring 17 secured in an annular groove formed in the cover 5, as shown most clearly in Fig. 9. The inner end of the rotor 2 is journaled in the opening 14. The piston 4 extends through the axis of the rotor and the width of the same is approximately equal to the depth of the pump chamber while the length of the piston is such that both ends of the same are always in contact with the walls of the chamber. The piston is preferably made of steel and has formed in each end thereof a semicircular or concave seat. Arranged in each of these seats is a strip of packing material 18. In forming the packing strips we take a rod of packing material which is circular in cross section and has the same radius as the arc of the seat in the end of the blade. We then cut away a portion at one side of the rod and above the center line thereof and then impart a curvature to the face thus formed on the rod corresponding to the general or average curvature of the inner peripheral wall of the chamber. This strip is then set into the seat in the end of the blade so that the base portion of the strip opposite the truncated face fits into said seat and the side portions project beyond the seat and the face thereof abuts against the wall of the chamber.

It will be readily seen that owing to this construction, the strip is free to rock in its seat as the piston blade is turned so that the face of the packing strip will at all times conform to and compress tightly against the wall of the chamber. Furthermore, as the packing rocks one way or the other it will automatically increase or decrease the length of the piston blade and will therefore provide for the ever changing radius of curvature of the wall of the chamber or any probable imperfection therein and will tend to compensate for the wear on the wall of the chamber. Moreover, as each of the packing strips has a definite side area projecting beyond the end of the piston blade, it will follow that when fluid is being forced from one side of the piston to the opposite side thereof, the pressure of the fluid will act against the side of the packing strip and tend to clamp the strip against its seat, thus greatly increasing the efficiency of the packing. The reduced portion 3 of the rotor serves as a stud shaft and projects through and beyond the end of the casing and is adapted to receive thereon a lever 19 which is non-rotatably secured thereto and held in place by means of a lock nut 20, bolt 21 and washer 21ª. Fitting over the reduced portion 3 of the rotor is a disk or washer 22, shown in detail in Fig. 10, and which is held in place by means of a clamping ring 23. The washer 22 is slightly dished, as shown in Fig. 2 and is normally maintained under tension. A suitable bearing or packing 24 is provided for preventing leakage around the reduced portion 3 of the rotor.

Extending through the casing 1 is a bore or passageway 25 in the opposite ends of which are threadedly secured bushings 26 and 27 each of which has a bore therein in which is threadedly secured pins 28 and 29. Arranged within the bore 25 is a ball valve 30 the purpose of which will hereinafter appear. The pins 28 and 29 extend into the bore 25, as shown most clearly in Fig. 3. Threadedly secured over the ends of the bushings 26 and 27 are caps 30 and 31 which are readily removed so as to permit of adjustment of the pins. Leading from the bore 25 are a pair of bores or passageways 32 and 33 which lead into the piston chamber at diametrically opposite points. Leading from each of the bores 32 and 33 are a pair of threaded bores which are normally closed by threaded caps or plugs 34, 35.

The pressure chamber is adapted to be completely filled with a liquid such as glycerine or lubricating oil. The piston 4 normally occupies the position shown in Fig. 4. The bore 25 is provided with a circular restricted passageway 36 the purpose of which will hereinafter appear. The opposite sides of the piston are in communication with each other through the bores 32 and 33 and the bore 25. The shock absorber is preferably connected to the frame of the automotive vehicle as hereinbefore described, and the lever 19 is adapted to be rigidly connected to the vehicle axle in a manner well known to those skilled in the art.

With the vehicle at rest, the piston 4 occupies the position shown in Fig. 4. Upon downward movement of the vehicle body, the piston 4 will be moved in the direction of the arrows in Fig. 4. The liquid within the compartment A will be placed under pressure and tend to escape through the bore 33, restricted passageway 36, past ball valve 30, bore 25, and thence through bore 32 to the opposite side of the piston. Upon the rebound of the vehicle body, the piston 4 will be moved in the opposite direction whereupon the liquid within the chamber B will be placed under pressure and will tend to escape through the bore 32, bore 25, past ball check valve 30 which is maintained off of its seat by the pin 29 and thence through restricted passageway 36 to bore 33 and to the opposite side of the piston. By a proper adjustment of the pin 29, any desired checking action may be obtained. The pin 28 serves to prevent the ball valve 30 from closing the opening to the passageway 32. By the proper adjustment of the pins 28 and 29, the device may be adapted for use on either the right or left hand side of the vehicle.

As the ends of the piston blade 4 are provided with rockers 18 which are disposed in the undercut grooves, the friction between the rocker and piston is reduced to a point below the friction between the rocker ends and the wall of the chamber and consequently these rockers will always turn sufficiently to maintain a working contact between the piston and the bore and inasmuch as the piston with rockers attached thereto are of substantially constant length and as the bore is constructed upon the limacon curve previously described, there will be the proper working contact during the entire movement of the piston and irrespective of the direction of movement. Moreover, there will be no tendency for the blade to gouge or score the inner peripheral wall of the pressure chamber.

Various changes may be made in the details of construction as well as in the manner of arranging and securing the various parts in position without departing from the spirit of our invention. For example, the particular manner of adjusting the bypass of the liquid from one side of the piston to the opposite side thereof may be varied as the exigencies of the occasion may demand. It is therefore to be understood that the embodiment of the invention herein disclosed is merely illustrative and is not to be considered in a limiting sense and that the invention is limited only in accordance with the scope of the appended claims.

Having thus described our invention, what we claim is:

1. In a hydraulic shock absorber, the combination of a pressure chamber having a peripheral wall shaped to conform to a limacon curve, a rotor mounted in said chamber with its axis of rotation passing through the chordal center of the limacon and parallel to the principal axis of the chamber, a piston blade extending through said rotor transversely of its axis, said blade being shorter than the chordal length of the limacon.

2. In a hydraulic shock absorber, the combination of a pressure chamber having a peripheral wall shaped to conform to a limacon curve, a rotor mounted in said chamber with its axis of rotation passing through the choral center of the limacon and parallel to the principal axis of the chamber, a piston blade extending through said rotor transversely of its axis, said blade being shorter than the chordal length of the limacon and provided with seats at its extremities, and rockers mounted in said seats for pivotal movement toward either side of said piston blade and having working faces conforming to the interior of said chamber and adapted to bear against it as the piston blade is moved in either direction.

3. In a hydraulic shock absorber, the combination of a pressure chamber having a peripheral wall shaped to conform to a limacon curve, a rotor mounted in said chamber with its axis of rotation passing through the chordal center of the limacon and parallel to the principal axis of the chamber, a piston blade extending through said rotor transversely of its axis, said blade being shorter than the chordal length of the limacon and provided with seats at its extremities, and rockers mounted in said seats for pivotal movement toward either of said piston blade and having working faces conforming to the interior of said chamber and adapted to bear against it as the piston blade is moved in either direction, a by-pass for conveying liquid from one side of said piston blade to the other side thereof when said piston is moved in either direction.

4. A hydraulic shock absorber comprising a pressure chamber adapted to contain a liquid and having an inner peripheral wall shaped to conform to a limacon curve, a rotor mounted in said chamber, a piston blade extending through said rotor and bearing against the peripheral wall of said chamber at its opposite ends, a by-pass for conveying liquid from one side of said piston blade to the other side thereof when said piston is moved in either direction, and means for regulating the flow through said by-pass.

5. A hydraulic shock absorber comprising a chamber adapted to contain a liquid and having a peripheral wall which is shaped to conform to a limacon curve, a rotor mounted within said chamber and having its axis of movement passing through the chordal center of said limacon and parallel to the principal axis of the chamber, a vane carried by said rotor and having working faces at its opposite ends conforming to the interior of said chamber and bearing thereagainst and means for conveying a liquid from one side of said vane to the opposite side thereof when said vane is moved in either direction.

6. A hydraulic shock absorber comprising a casing having a chamber formed therein the inner peripheral wall of which is shaped to conform to a limacon curve, a rotor mounted in said chamber and having one end projecting through said casing and adapted for rigid connection with one of two relatively movable members, a vane carried by said rotor and having working faces at its opposite ends conforming to the interior of said chambers and engaging the walls thereof, a bore connecting the opposite sides of said vane and means for regulating the flow therethrough, a cover closing the end of said chamber adapted to be rigidly connected with the other of said relatively movable members.

7. In a hydraulic shock absorber, the combination of a pressure chamber the inner peripheral wall of which is shaped to conform to a limacon curve, a rotor journaled in said chamber with its axis of rotation passing through the chordal center of the limacon and parallel to the principal axis of the chamber, a piston extending freely through said rotor and transversely of its axis and bearing against the peripheral wall of said chamber at its opposite ends, a by-pass for conveying liquid from one side of said piston to the other side thereof when the piston is moved in either direction, valve means arranged within said by-pass and means operable from the exterior of said by-pass for adjusting said valve means for regulating the flow through said by-pass.

In testimony whereof, we hereunto affix our signatures.

ELLIOTT W. BEIDLER.
AMANDUS C. ROESSLER.